United States Patent Office 3,072,731
Patented Jan. 8, 1963

3,072,731
ISOMERIZATION PROCESS AND CATALYST
Howard Emerson Merrill, Baton Rouge, La., assignor to Esso Research and Engineering Company, a corporation of Delaware
No Drawing. Filed Sept. 17, 1958, Ser. No. 761,483
9 Claims. (Cl. 260—683.75)

The present invention relates to improvements in the art of converting hydrocarbons to more valuable isomers and is particularly directed to the catalytic isomerization of straight chain paraffin hydrocarbons to the corresponding branched chain hydrocarbons. The invention is especially concerned with the isomerization of normal paraffin hydrocarbons of from 4 to 7 carbon atoms.

With the continued progress of the automotive industry there has been more and more emphasis on the use of gasoline engines with greater compression ratios to obtain higher efficiency. In order to satisfy the requirements of such engines it has been necessary for petroleum refiners to provide motor fuels of increasingly greater octane rating. Among the available processes that can be used for upgrading the light naphtha components of such fuels, isomerization appears to be very valuable from an economic standpoint. Furthermore, it may be stated as a general proportions that the iso-paraffinic and branched chain paraffin hydrocarbons are of greater commercial value to the petroleum industry than the corresponding normal or straight chain paraffin hydrocarbons. Thus for example 2,2-dimethyl butane has a higher octane rating than the isomeric normal hexane. Isobutane is more valuable than normal butane since the former can be used as the basis for the preparation of 8-carbon-atom branched chain hydrocarbons by alkylation with butylene.

The isomerization of normal paraffin hydrocarbons of from 4 to 7 carbon atoms to the corresponding branched chain homologs is well known. For effecting the isomerization it is customary to employ certain metal halides, particularly aluminum chloride or aluminum bromide, in conjunction with certain promoters such as hydrogen chloride, hydrogen bromide or boron fluoride. Insofar as the isomerization of the hydrocarbons in light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g. in the range of about 60° to about 120° F.

It is an object of the present invention to provide means for enhancing the activity of aluminum halide catalyst, and particularly aluminum bromide as an isomerization catalyst for normal paraffin hydrocarbons of 4 to 7 carbon atoms, particularly pentane and hexane.

In accordance with the present invention it has been found that the isomerization activity of aluminum bromide is markedly increased when the catalyst is associated with certain molybdenum compounds, particularly $MoO_3$. The valence of the molybdenum present may be in the range of 2 to 6, preferably in the range of 4 to 6. It is also a desirable feature of the invention that the aluminum bromide be supported on, mixed with, or impregnated into a suitable support, both for the purpose of enhancing the activity of the catalyst as well as for the purpose of reducing its solubility in the hydrocarbons present during the reaction. The latter feature is important because large losses of catalyst in the product would add considerably to the cost of the process.

Among the supports or carriers that may be used in this invention are included activated carbon, activated alumina, pumice, silica gel, fuller's earth, various activated clays and calcined bauxite. Associated with the support and/or the catalyst, the molybdic oxide must be present above a minimum amount, as set forth below. Molybdenum oxide, or mixtures of it with other materials such as the supports mentioned above, may constitute the catalyst support. A particularly useful support is one consisting of about 80 to 98% $Al_2O_3$ and about 20 to 2% $MoO_3$. The preferred range is from about 88 to 94% $Al_2O_3$ and about 12 to 6% $MoO_3$. Such a catalyst support may be prepared by impregnating the base, such as alumina, silica or others mentioned above, with an aqueous solution of ammonium molybdate of sufficient strength to give the desired concentration of ammonium molybdate on the base. This impregnated support may then be calcined to decompose the ammonium molybdate into $MoO_3$. Among alternate methods of catalyst support preparation is the method of commingling where $MoO_3$ and the catalyst base are physically mixed and heated (700° to 1500° F., depending on the base used) to distribute the $MoO_3$ over the surface of the base.

A molybdenum oxide-containing catalyst support prepared by the methods outlined above or by other methods known in the art may be impregnated with aluminum halides in the following manner. The aluminum halide, particularly aluminum bromide, may be dissolved in a suitable solvent such as light naphtha or its hydrocarbon components and the porous molybdenum-oxide-containing support is impregnated with this solution. It is advantageous that the naphtha or hydrocarbon components to be isomerized be used as a solvent in preference to other solvents in which aluminum halide is soluble such as ethylene dichloride or dioxane since such nonhydrocarbon solvents will have to be stripped from the support prior to use. The molybdenum oxide-containing support has a great affinity for the aluminum halide and sufficient aluminum halide will be adsorbed from solution to carry out the isomerization.

Alternatively, the aluminum halide may be mixed with the molybdenum-oxide-comprising support and the mixture heated to effect impregnation of the support. Loosely held aluminum halide may then be removed by heating the mass and passing an inert gas therethrough, such as nitrogen, carbon dioxide, hydrogen or methane.

These methods of catalyst preparation are equally applicable to a catalyst support consisting entirely of molybdenum oxide or a support consisting of $MoO_3$ impregnated on alumnia, silica or other commonly used catalyst bases.

The proportion of $MoO_3$-containing support to aluminum halide catalyst should be at least 2 to 1 by weight but from a practical standpoint should not exceed about 50 to 1. Stated conversely, the ratio of aluminum halide to support should not exceed about 50 to 1. Thus, the ratio of aluminum halide to support should be in the range of 2 to 50 parts of the halide for each 100 parts of support. The preferred range is from about 5 to 40 parts of aluminum halide per 100 parts of support.

As set forth hereinafter, a preferred embodiment of the present invention consists in contacting normal paraffin hydrocarbons of from 4 to 7 carbon atoms in the liquid phase at temperatures in the range of about 60° to about 120° F., and preferably at a temperature no higher than 110° F., with a catalyst selected from the class consisting of aluminum bromide and mixtures of aluminum bromide and aluminum chloride wherein, on a batch operation basis, at least 3.5 weight percent of aluminum bromide is present, based on the hydrocarbon feed, and wherein, additionally, the percentage of aluminum bromide present, when added to 0.4 the percentage of aluminum chloride present, totals at least 8 percent based on the hydrocarbon feed. Additionally the catalyst is associated with a support in the ratio of from 2 to 50 parts of catalyst per 100 parts of support, and there is present 5 to 200% of molybdenum oxide, based on the weight of aluminum bromide present.

Advantageous as it is to use the molybdenum oxide promoter of the present invention, its use is accompanied by severe cracking and sludging problems, tending to inactivate the catalyst. Further in accordance with the present invention, it has been found that when about 1 to 50% of certain cyclic compounds are included in the feed to the isomerization zone, substantially no cracking was observed. These compounds are naphthenes, such as the methyl cyclopentanes, cyclohexane, methyl cyclohexane and the like; and also isobutane is effective in reducing the cracking side reaction.

It is important that aromatics be removed since very small amounts greatly reduce the degree of isomerization. The amount of naphthene present is dependent upon the hydrocarbon being isomerized. For $C_5$ and $C_6$, from 1 to 20% naphthenes are effective in reducing cracking, while for $C_7$, 20 to 50% naphthenes are needed to suppress the cracking reaction.

The process may be conducted either as a batch operation or as a continuous operation, the latter being preferred for economic reasons. In continuous operation, flow rates of from 0.2 to 1.5 v./v./hr. (volume of feed per volume of total catalyst, including support, per hour) may be used. The apparatus employed is of a conventional nature and may comprise a tower containing a fixed bed of the catalyst through which the reacting hydrocarbons are circulated, with an external recycle line to send the reactants back through the bed any number of times. A similar tower with a recycle line may be used for a slurry type of operation in which the suspension of catalyst and hydrocarbons is recirculated through the tower, which in this case will have baffle plates or similar mixing plates, or some other means of agitation, such as a mechanical stirrer or a simple mixing pump. Alternatively, the reactor may be a simple mechanically stirred reactor containing the mixture of catalyst and reacting hydrocarbons.

Where slurry operation is used, the slurry is removed from the reactor at the end of the reaction period, in the case of batch operation, or as a small sidestream in the case of continuous operation. and sent to suitable separation equipment, as for example, a simple settling tank, a centrifuge, or a filter, or suitable combinations of such equipment, to separate the catalyst from the hydrocarbons. Dissolved aluminum halide is removed by distillation of the product, the catalyst remaining with the bottoms.

Alternatively, dissolved halide can be removed by percolating the product through an adsorbent such as bauxite, diatomaceous earth or charcoal, or by chilling the product to temperatures as low as −30° F. in a heat exchanger and separating the halide by filtration. To aid crystallization, a portion of the exit stream from the heat exchanger can be recycled to mix with the product stream going into the heat exchanger, thereby furnishing crystal nuclei for further crystallization. By employing two filters in parallel, operating alternately, the aluminum halide that accumulates on the filters can be recovered by passing warm feed through the filter not being used for catalyst removal.

The slow solubility of the halide in the reacting hydrocarbons or in the product can be compensated for by adding make-up halide to the feed stream. When conventional promoters such as HF, $BF_3$, HBr or HCl, or cracking inhibitors such as naphthenes are used, these can be added along with the feed.

Aromatics and other materials that tend to be detrimental to the isomerization reaction may be removed by conventional means such as acid treating, mild hydrogenation, or the like. If such deleterious materials are present in only small quantities the feed may be treated to remove them by contacting the contaminated feed with a spent Friedel-Crafts catalyst such as spent $AlBr_3$ on calcined bauxite. The contacting may be effected by percolation, or by vaporization of the feed through the spent catalyst or by a slurry contacting operation, followed by filtration.

The following examples serve to illustrate the advantages of this invention.

*Example 1*

The relative effectiveness of a number of materials as promoters for aluminum bromide isomerization catalysts was compared in the following manner.

A measured quantity of aluminum bromide was placed in a closed glass reaction vessel after which measured amounts of the promoter material being tested and the hydrocarbon to be isomerized were also placed in the vessel. The mixture of hydrocarbon, catalyst and promoter was shaken at room temperature and at whatever pressure developed in the glass reaction vessel for the entire reaction period. At the end of the reaction period the liquid product was decanted from thte solids present, washed with 15% caustic solution and analyzed by gas chromatography.

In the manner just described the following metallic oxides were examined for their isomerization promotion effects. In each run the hydrocarbon to be isomerized consisted of 89% n-hexane and 11% methyl cyclopentane. Each run was conducted at 78° F. in the presence of 20 wt. percent $AlBr_3$ and 40% (wt.) of the promoter for a period of two hours. No cracking was observed. The percentage conversion of normal hexane to isohexanes is given below. The higher yield with the molybdenum oxide promoter is evident.

| Promoter | Percent Isomerization of n-$C_6$ | Avg. Number of Runs | Percent 2,2-DMB in Product |
|---|---|---|---|
| $MoO_3$ | 83.5 | 4 | 24.9 |
| $MnO_2$ | 70.2 | 1 | 18.6 |
| CuO | 66.4 | 1 | 14.8 |
| $Fe_2O_3$ | 65.6 | 2 | 16.0 |
| $UO_3$ | 62.6 | 1 | 15.3 |
| $Co_2O_3$ | 28.8 | 1 | 2.4 |
| $CrO_3$ | 20.0 | 1 | 2.5 |
| $Fe_3O_4$ | 15.6 | 1 | 1.4 |
| $WO_3$ | 10.6 | 1 | 0.9 |

*Example 2*

In experiments similar to those described in Example 1 a comparison of various feed compositions was made. When pure n-hexane was reacted for two hours with 20 wt. percent $AlBr_3$ and 40 wt. percent $MoO_3$ considerable cracking and disproportionation took place at the expense of isomerization. However, when 10% methyl cyclopentane was included in the feed no cracking was observed in four duplicate runs and isomerization was high as shown in the table below:

| Feed | Percent Conversion of n-$C_6$ to | |
|---|---|---|
| | iso-$C_6$ | $C_5-$, $C_7+$ |
| n-$C_6$ | 28.2 | 47.2 |
| 90% n-$C_6$, 10% MCP | 83.5 | 0 |

*Example 3*

Under the same reaction conditions as in Example 1, a dearomatized "Aramco" $C_6$ naphtha was isomerized over 20 wt. percent $AlBr_3$ and 40 wt. percent promoter for two hours at room temperature. The $C_6$ paraffins in the naphtha were converted 77% to isohexanes using a $MoO_3$ support while iron oxide converted only 71% of the $C_6$ paraffins.

*Example 4*

Under the same reaction conditions as in Example 1, the effectiveness of molybdenum oxide as a promoter was compared when the promoter was present as such and when it was suported on a standard alumina support. In addition, the activities of iron oxide, and of iron oxide supported on alumina (Porocel), were likewise determined.

|  | Percent Isomerization of n-C$_6$ | Percent 2,2-DMB in Product |
|---|---|---|
| MoO$_3$ | 83.5 | 24.9 |
| 10% MoO$_3$/Al$_2$O$_3$ | 83.2 | 32.7 |
| Fe$_2$O$_3$ | 65.6 | 16.0 |
| 2.5% Fe$_2$O$_3$/Al$_2$O$_3$ | 74.9 | 21.1 |

These data indicate again the effectiveness of MoO$_3$. Also, advantage is to be seen in the supported MoO$_3$ in view of the greatly increased yield of 2,2-dimethyl butane using the MoO$_3$ supported on alumina.

*Example 5*

The effect of the concentration of MoO$_3$ supported on alumina upon the extent of isomerization is shown by the following data. Catalyst supports with varying amounts of MoO$_3$ on "Nalco" alumina were prepared by impregnating the alumina with ammonium molybdate followed by calcination. Hydrocarbon feed (90% n-C$_6$; 10% MCP) was reacted with 40 wt. percent of the prepared catalyst support and 20 wt. percent AlBr$_3$ for two hours at room temperature, as described in Example 1. The results given below compare the concentration of MoO$_3$ with percent conversion of n-hexane to isohexanes and are average values for at least two runs at each MoO$_3$ concentration.

| Percent MoO$_3$ on Alumina | Percent Conversion of n-C$_6$ |
|---|---|
| 0 ("Nalco" Alumina) | 9.6 |
| 3.3 | 43.0 |
| 6.0 | 83.0 |
| 10.0 | 83.2 |
| 10.6 | 60.5 |
| 21.0 | 31.9 |

The process of the present invention may be modified in numerous respects without departing from its scope. Thus it may be desirable, prior to carrying out the isomerization, to reduce the molybdenum trioxide with hydrogen under conditions to give a product wherein the molybdenum oxide has a valence of 3 to 5, preferably 4.0 to 4.5. Thereafter the partially reduced catalyst support is employed in combination with the aluminum halide isomerization catalyst. In still another modification, it will be desirable to employ as a reaction modifier molybdenum oxide in the form of cobalt molybdate supported on alumina or other support. Such systems are particularly useful in avoiding cracking. Thus broadly, mixed metal oxides of the transition series, such as oxides of zirconium, molybdenum and tungsten, and in particular molybdates of iron, cobalt and nickel, are especially active as isomerization promoters when used in conjunction with a Friedel-Crafts catalyst, and preferably aluminum bromide, isomerization catalyst and when associated with or impregnated on silica, alumina and other common catalyst supports.

*Example 6*

A feed consisting of 10% methyl cyclopentane and 90% normal hexane by volume was treated for two hours at room temperature with 20 wt. percent aluminum bromide catalyst employing 40 wt. percent of cobalt molybdate supported on alumina. The isomerized product was analyzed and it was found that 66% of the normal hexane was converted to isohexane.

What is claimed is:
1. A process for isomerizing a hydrocarbon stream containing a major portion of n-hexane which comprises freeing said stream from materials that are detrimental to the isomerization reaction, thereafter contacting said hydrocarbon stream containing a major portion of n-hexane in the liquid phase with a catalyst composition comprising aluminum bromide and a molybdenum oxide and recovering isomerized paraffinic hydrocarbons.
2. The process of claim 1 wherein said molybdenum oxide is on a support.
3. The process of claim 2 wherein said support is an activated alumina.
4. The process of claim 2 wherein said support is a calcined bauxite.
5. An improved process for isomerizing a hydrocarbon stream containing a major portion of n-hexane which comprises freeing said hydrocarbons from materials that tend to be detrimental to the isomerization reaction, thereafter contacting said hydrocarbons in the liquid phase at a temperature of from about 60° to about 120° F. with an isomerization catalyst selected from the class consisting of aluminum bromide and mixtures of aluminum bromide and aluminum chloride wherein at least 3.5% by weight AlBr$_3$ based on feed is present, and 5 to 200% of an oxide of molybdenum, based on AlBr$_3$, thereafter separating reaction product from the catalyst and recovering isomers of the said paraffinic hydrocarbons.
6. The process of claim 5 wherein said molybdenum has a valence of from 4 to 6.
7. The process of claim 5 wherein said isomerization catalyst composition is supported on alumina.
8. The process of claim 7 wherein the ratio of support to the catalyst is 2 to 50 parts catalyst per 100 parts of support.
9. The process of claim 5 wherein 1 to 50% of naphthenes are introduced into said isomerization zone along with said paraffinic hydrocarbons.

References Cited in the file of this patent

UNITED STATES PATENTS

| 2,277,512 | De Simo et al. | Mar. 24, 1942 |
| 2,355,198 | Atwell | Aug. 8, 1944 |
| 2,355,339 | Story | Aug. 8, 1944 |
| 2,393,051 | McMillan et al. | Jan. 15, 1946 |
| 2,805,269 | Carter et al. | Sept. 3, 1957 |
| 2,878,241 | Schneider | Mar. 17, 1959 |
| 2,966,535 | Schriesheim et al. | Dec. 27, 1960 |